UNITED STATES PATENT OFFICE.

FELIX KAUFLER, OF MUNICH, GERMANY, ASSIGNOR TO THE FIRM DR. ALEXANDER WACKER GESELLSCHAFT FÜR ELEKTROCHEMISCHE INDUSTRIE G. M. B. H., OF MUNICH, BAVARIA, GERMANY.

PROCESS FOR THE MANUFACTURE OF DICHLORETHYLENE.

1,419,969.     Specification of Letters Patent.     Patented June 20, 1922.

No Drawing.     Application filed July 18, 1921. Serial No. 485,671.

*To all whom it may concern:*

Be it known that I, FELIX KAUFLER, a citizen of Austria, residing at Munich, Germany, have invented certain new and useful Improvements in Processes for the Manufacture of Dichlorethylene (for which I have made application in Germany, Dec. 23, 1919), of which the folowing is a specification.

The present invention refers to the manufacture of dichlorethylene.

It is known that dichlorethylene may be obtained by the action of metals in the presence of water on symmetrical tetrachlorethane. This reaction has been described for aluminium, zinc and iron. In the case of zinc and aluminium it suffices to heat the constituents to the boiling point of the liquid, but the reaction is frequently difficult to control. In the case of iron it has been necessary to operate under pressure and to distil away from time to time the dichlorethylene produced; but this necessitated a costly apparatus and a difficult operation. The present invention is based on the new observation that dichlorethylene can be obtained from tetrachlorethane without excess pressure and in regular reaction if both the water and the tetrachlorethane are caused to react on the metal preferably aluminium, zinc, iron, magnesium, while they are in the form of vapour, instead of heating the water and metal with the tetrachlorethane as hitherto practised. The metal may be used in the form of turnings, waste sheet, filings, granules, wire, strips, or any other form affording a large surface. The following examples illustrate the invention:—

1. The vapour of tetrachlorethane and steam are together conducted through a chamber charged with iron turnings and the issuing mixture of steam and dichlorethylene is condensed in known manner and the condensed liquid is fractionally distilled.

2. The mixture of tetrachlorethane vapour and steam is produced by heating together water and tetrachlorethane, or by blowing steam into tetrachlorethane, or by both operations simultaneously.

3. Tetrachlorethane is converted as described in Example 1 or 2 into a mixture of dichlorethylene, tetrachlorethane and water, all in the form of vapour, and then the main quantity of the tetrachlorethane is separated by partial condensation and returned to the reaction. The uncondensed part is then completely condensed and yields the dichlorethylene which may be completely purified by distillation.

4. Tetrachlorethane is caused to act in the manner described in Example 1, 2 or 3 in the form of vapour and together with steam upon granulated zinc. There is produced a dichlorethylene which may be completely purified by distillation.

The yield of crude dichlorethylene in Examples 1, 2 and 3 may amount to 88 per cent of that theoretically possible. On fractional distillation this crude product gives about 90 per cent of dichlorethylene which boils at 48–60° C., and has a specific gravity of 128, so that a mixture of the two stereoisomeric dichlorethylenes without any essential impurity is obtained. The composition was confirmed by determining the chlorine present. The residue, according to its boiling point and specific gravity, is unchanged tetrachlorethane.

The yield of crude product in Example 4 amounts to about 85 per cent. From this crude product there is obtained about 90 per cent of pure dichlorethylene of the same boiling point as that of the product of Examples 1, 2 and 3. It is, therefore, also a mixture of the two dichlorethylenes.

I claim:—

1. The process for manufacturing dichlorethylene which consists in bringing vapours of tetrachlorethane and steam at ordinary atmosphere pressure into contact with a metal capable of withdrawing chlorine from organic substances.

2. The process for manufacturing dichlorethylene which consists in bringing vapours of tetrachlorethane and steam at ordinary atmospheric pressure into contact with iron.

In testimony whereof I hereunto affix my signature in the presence of two witnesses.

FELIX KAUFLER.

Witnesses:
PAUL DREY,
RICHARD LINZ.